United States Patent Office 3,102,135
Patented Aug. 27, 1963

3,102,135
PRODUCTION OF BENZOIC ACIDS AND 1-(CAR-
BOXYPHENYL)-INDANE CARBOXYLIC ACIDS
John C. Petropoulos, South Norwalk, Conn., and Richard
K. Madison, Murray Hill, N.J., assignors to American
Cyanamid Company, New York, N.Y., a corporation
of Maine
No Drawing. Filed Oct. 10, 1961, Ser. No. 144,048
6 Claims. (Cl. 260—515)

This invention relates to a synthesis of 1-(carboxyphenyl)-indanoic acids by the dimerization of alkenylbenzoic acids and to a method for the production of alpha-beta unsaturated alkenylbenzoic acids suitable for use therein.

The 1-(carboxyphenyl)-indanoic acids have recently proved to be of great importance in the production of alkyd resins by reaction with ethylene glycol, glycerol, pentaerythritol and other polyhydric alcohols, with or without modification with non-drying oils, semidrying oils or drying oils such as coconut oil, cottonseed oil, soya oil, linseed oil or the fatty acids thereof. This is shown in the copending application of John C. Petropoulos, Serial No. 414,860, filed March 8, 1954, now abandoned, which also describes a number of acids of this class. It is a principal object of the present invention to provide methods for synthesizing these and other related 1-(carboxyphenyl)-indanoic acids from relatively cheap starting materials that are available commercially in large quantities.

Our invention is based on the discovery that the 1-(carboxyphenyl)-indanoic acids can be obtained in almost quantitative yields by dimerizing alkenylbenzoic acids containing alkenyl radicals of from 3 to 8 or more carbon atoms having the double bond adjacent a carbon atom attached to the benzoic acid nucleus. Alkenylbenzoic acids of this type are described by the formula:

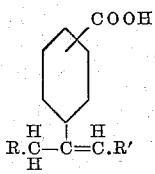

in which R and R′ are hydrogen or alkyl hydrocarbon radicals of 1 to 5 carbon atoms, the total number of carbon atoms in R and R′ being not more than 5. Typical compounds of this class are the isopropene-2-yl-benzoic acids, butenylbenzoic acids such as 4-(2-butene-2-yl)-benzoic acid and 3-(2-butene-2-yl)-benzoic acid; 4-(3-butene-2-yl)-benzoic acid, 4-(2-pentene-2-yl)-benzoic acid, 4-(2-hexene-2-yl)-benzoic acid, 4-(2-octene-2-yl)-benzoic acid and the like. These and other compounds of the same class are dimerized by heating in the presence of acidic condensing agents such as aqueous mineral acids, aluminum halides and the like, the reaction being as follows:

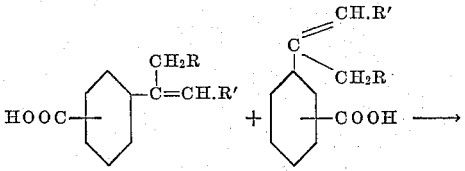

We have also discovered as one of the most important features of our invention that intermediates capable of forming the above-described alkenylbenzoic acids can be prepared from the corresponding alkyltoluenes by catalytic oxidation procedures. We have found that the secondary alkyltoluenes are oxidized by such procedures into hyroxyalkylbenzoic acids wherein the hydroxyl radical is attached to the same carbon atom that joins the aliphatic group to the aryl nucleus. The oxidation products are, therefore, easily converted by dehydration into the corresponding alkenylbenzoic acids containing alpha-beta unsaturation; i.e., having the double bond adjacent the carbon atom attached to the benzoic acid nucleus. Oxidation of the alkyltoluenes is readily carried out in the liquid phase and in the presence of dissolved or suspended polyvalent metal oxidation catalysts such as the naphthenates, octoates or other oil-soluble salts of cobalt, nickel, iron, manganese and the like by passing air or oxygen through the toluene compound by the procedures hereinafter described.

The hydroxyalkylbenzoic acids described above can also be produced by the oxidation of hydroxyalkyltoluenes wherein the hydroxyl group is attached to the same carbon atom of the alkyl chain as the aryl nucleus. The same catalysts are used in this case and substantially the same oxidizing conditions; i.e., passage of air or oxygen through the reagent. In both cases, suitable oxidation temperatures are within the range of from about 40° C.–50° C. to about 180° C., the range above about 120° C. being employed when high-boiling organic solvents such as acetic acid, p-dichlorbenzene and the like are used or when the oxidation is carried out under superatmospheric pressures.

The hydroxyalkylbenzoic acids obtained by the above-described oxidation procedures, which are hereinafter referred to as alpha-hydroxyalkylbenzoic acids, are easily dehydrated to the corresponding alkenylbenzoic acids by heating them with dilute mineral acids such as hydrochloric acid, sulfuric acid, phosphoric acid and the like. They are also dehydrated under the conditions used in the dimerization and, therefore, this dehydration is preferably carried out as a part of the dimerization reaction. Instead of dimerizing the alpha-hydroxyalkenylbenzoic acids or their dehydration products, however, these compounds may first be converted into their corresponding nonfunctional benzoic acid derivatives; i.e., into their esters, amides or salts. The alkenylbenzoic acid compounds of this type undergo hydrolysis during the dimerization reaction and liberate the same final products as the free acids or dimerization catalyts such as aluminum chloride may be used which form the corresponding esters and amides of 1-(carboxyphenyl)-indanoic acids.

It will be seen from the foregoing that the synthesis of the invention is as follows, the symbols R and R′ being as defined above and the para-isomers being shown as illustrative:

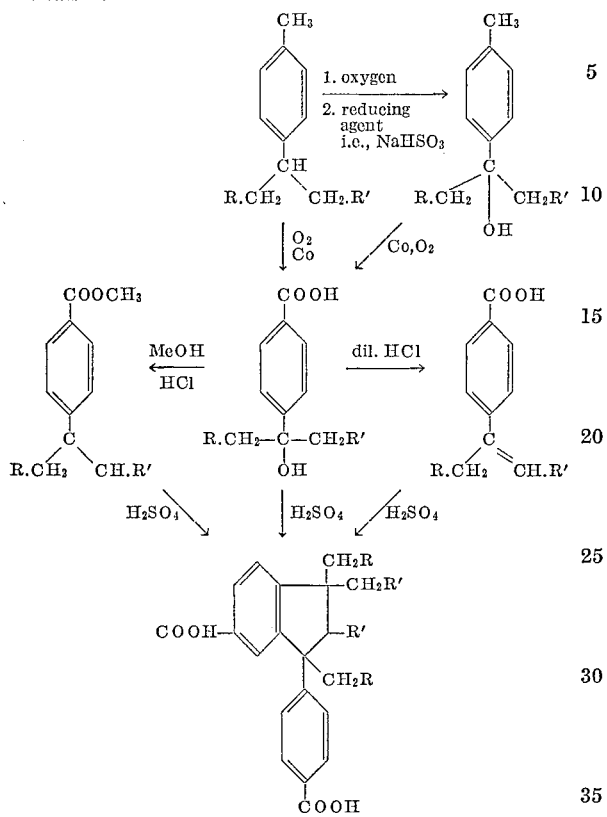

In practicing the invention any alkyltoluene or alpha-hydroxyalkyltoluene in which the alkyl radical contains from 3 to 8 carbon atoms may be used as a starting material, if it is attached to the toluene nucleus by a secondary carbon atom. This is of great commercial importance, for it permits the use of relatively cheap materials obtained by the alkylation of toluene with propylene and other olefins obtained from refinery still gases. Thus, for example, toluene may be alkylated with any of the following olefins, or with mixtures thereof:

$$CH_2=CH-CH_3$$
$$CH_2=CH-CH_2-CH_3$$
$$CH_3-CH=CH-CH_3$$
$$CH_3-CH=CH-CH_2-CH_3$$

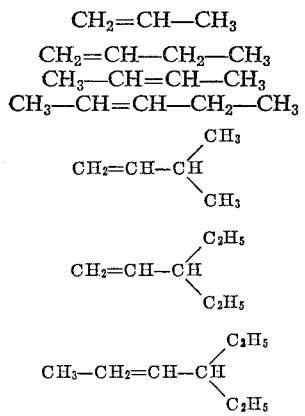

The corresponding secondary alcohols may likewise be used for the alkylation as may also the corresponding halides such as the following:

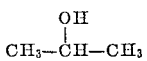

or

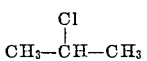

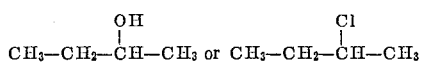

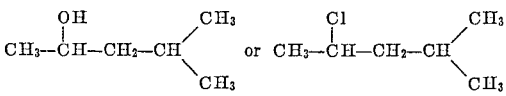

Any of the well-known alkylation processes may be used to combine the above and other similar olefin hydrocarbons, alcohols and halides with toluene, such as by the use of phosphorous pentoxide, hydrofluoric acid, sulfuric acid or other acidic condensation catalysts. We prefer, however, to carry out the alkylation with the use of acid-activated montmorillonite subbentonite catalysts as described in U.S. Patent No. 2,564,488, since these catalysts produce a higher yield of meta- and para-substituted toluenes. It will be understood that such meta- and para-substituted toluenes and mixtures thereof are greatly preferred to the ortho-substituted alkyltoluenes in practicing the present invention, since upon oxidation they yield the corresponding meta- and para-hydroxyalkylbenzoic acids which, in turn, produce the corresponding meta- and para-alkenylbenzoic acids which are more readily dimerizable than are the corresponding ortho-substituted benzoic acids because of their lack of steric hindrance.

The invention will be particularly described and illustrated with reference to the cymenes and dimethyltolyl carbinols which are typical of all of the starting materials used and are readily obtainable commercially. Para-cymene, for example, is readily converted into alpha-hydroxyisopropylbenzoic acid by adding about 1% by weight of manganese or cobalt as the octoate, naphthenate or other hydrocarbon-soluble salt and passing oxygen through the solution at temperatures about 50° C.-90° C. for 15-30 hours. The unreacted toluene as well as undesired by-products are volatile with steam, and are therefore separated by steam distillation. The alpha-hydroxyisopropylbenzoic acid can be further purified, if desired, by recrystallization from boiling water, or the product may be added directly to aqueous sulfuric acid or other dimerizing agent and the mixture heated until the formation of 1-(4-carboxyphenyl)-1,3,3-trimethyl-6 - indanoic acid is completed. If meta-cymene is used as the starting material, the same reaction conditions are employed but the final product is 1-(3-carboxyphenyl)-1,3,3-trimethyl-5-indanoic acid. If mixtures of ortho-, meta- and para-cymenes are used, they are converted by the oxidation reaction into the corresponding alpha-hydroxyisopropyl-benzoic acids and upon dimerization a mixture of the corresponding isomeric 1-(carboxyphenyl)-1,3,3-trimethyl indanoic acids is formed.

With the same procedures and reaction conditions 4-(1-butene-2-yl)-methylbenzene is converted into 1-(4-carboxyphenyl)-1,3-diethyl-6-indanoic acid; 4-(1-pentene-2-yl)methylbenzene is converted into 1-(4-carboxyphenyl) - 1,3 - dipropyl - 6 - indanoic acid; 4-(3-methyl-1-butene-2-yl)methylbenzene is converted into 1-(4-carboxyphenyl) - 1,3 - diisopropyl - 6 - indanoic acid; 4-(3-ethyl-1-pentene-2-yl)methylbenzene is converted into 1-(4-carboxyphenyl)-1,3-di-(2-ethylpropyl) - 6 - indanoic acid and 4-(4-ethyl-1-hexene-2-yl)methylbenzene is converted into 1-(4-carboxyphenyl)-1,3-di-(2-ethylbutyl-6-indanoic acid. The corresponding 1-(3-carboxyphenyl-5-indanoic acids are obtained under the same conditions when the corresponding 3-methylbenzenes are used.

The invention will be further described and illustrated by the following specific examples. Most of these examples describe the isolation of the intermediate products in a purified condition; this is done primarily in order to demonstrate the chemistry of the process. It will be understood, however, that in actual plant operations it is not necessary to isolate the intermediates but that the process steps can be taken in sequence, with suitable removal of impurities, if desired, to provide a complete and, if desired, continuous operating procedure.

*Example 1*

A three-necked reaction flask fitted with a gas inlet tube, thermometer, water trap and condenser was charged with 684 grams (5.1 mols) of para-cymene containing 6 ml. of cobalt octoate (6% cobalt) and the temperature was raised to and maintained at 60° C.–70° C. while oxygen gas was passed through the reaction mixture at a rate of 0.4 liter per minute. The oxidation was continued for 20 hours after which the resulting mixture was steam-distilled to remove unreacted para-cymene, 2-p-tolyl-2-propanol and p-methylacetophenone. On standing the residue crystallized.

The material was recrystallized from water to give a white crystalline solid melting at 154° C.–156° C. having an acid number of 324. The compound was further identified by infrared spectroscopy as para-alpha-hydroxyisopropylbenzoic acid. The yield was 28.5% by weight on the starting material.

A portion of the recrystallized product was added to a reaction vessel equipped with an agitator and reflux condenser and containing aqueous sulfuric acid in the ratio of 45 parts by weight of water and 80 parts of concentrated sulfuric acid for each part of para-alpha-hydroxyisopropylbenzoic acid and heated to reflux temperatures. The mixture was refluxed with agitation for 20 hours and the resulting solid product was collected on a filter, dried and weighed. It was identified as 1-(4-carboxyphenyl)-1,3,3-trimethyl-6-indanoic acid by its melting point of 295° C. after a single recrystallization from glacial acetic acid. This melting point was not depressed when a portion of the product was mixed with an authentic sample of the same indanedicarboxylic acid prepared by another method.

*Example 2*

Another portion of the p-(alpha-hydroxyisopropyl)benzoic acid of Example 1 was dissolved in an aqueous hydrochloric acid obtained by adding 1 part of concentrated hydrochloric acid to 2 parts of water. On warming, the solution deposited a mass of fine white needle-like crystals having a melting point of 157° C.–161° C. and an equivalent weight by titration of 161. The compound was further identified by infrared as para-isopropenylbenzoic acid.

This product was dimerized by the procedure of Example 1, i.e., by refluxing it with aqueous sulfuric acid. 1-(4-carboxyphenyl)-1,3,3-trimethyl-6-indanoic acid was obtained in a 94% yield.

*Example 3*

Another portion of the p-(alpha-hydroxyisopropyl)benzoic acid of Example 1 was esterified by heating it with excess methanol and dry hydrogen chloride to produce methyl-p-isopropenylbenzoate. The product boiled at 98° C. at 0.5 mm. of mercury pressure; its melting point was 52° C.–52.5° C.

A portion of the ester was added to a mixture of 80 parts of concentrated sulfuric acid and 45 parts of water and dimerized by refluxing with agitation as described in Example 1. The same 1-(4-carboxyphenyl)-1,3,3-trimethyl-6-indanoic acid was obtained, showing that the ester was hydrolyzed by the acid treatment.

Another portion of the methyl ester was converted into the corresponding p-isopropenylbenzamide by reaction with ammonia. When this material was refluxed with aqueous sulfuric acid, as described in Example 1, the same product was obtained as when the ester was used. This shows that the amides of isopropenylbenzoic acids can also be used in the dimerization reaction.

*Example 4*

The reaction flask described in Example 1 was charged with 400 grams (2.98 mols) of meta-cymene containing 3.5 ml. of cobalt octoate and the temperature was raised to and maintained at 75° C.–85° C. for 30 hours while oxygen was passed through the mixture at the rate of 0.4 liter per minute.

The reaction mixture was steam-distilled to remove by-products and unreacted cymene and the residue was extracted with boiling water. On concentration and cooling a white crystalline solid formed which had a melting point of 122° C.–124° C. and an equivalent weight of 179 and which was further characterized by its infrared curve as m-(alpha-hydroxyisopropyl)benzoic acid.

A portion of this product was added to aqueous sulfuric acid and dehydrated and dimerized by refluxing as described in Example 1. The product after recrystallization from acetic acid was obtained as 1-(3-carboxyphenyl)-1,3,3-trimethyl-5-indanoic acid, a white crystalline solid having an uncorrected melting point of 210° C.

*Example 5*

Another portion of the m-(hydroxyisopropyl)benzoic acid of Example 4 was dehydrated by dissolving it in dilute hydrochloric acid (1 part conc. hydrochloric acid, 2 parts water) and warming. Metaisopropenylbenzoic acid was deposited as a crystalline product having a melting point of 98° C.–99° C. and an equivalent weight by titration of 162. Dimerization of this material by the procedure of Example 4 produced the same 1-(3-carboxyphenyl)-1,3,3-trimethyl-5-indanoic acid that was obtained in that example.

*Example 6*

A reaction flask fitted with a gas inlet tube and condenser was charged with 500 grams of para-cymene containing 1% by weight of manganese naphthenate, was heated to 70° C.–80° C. and oxidized at this temperature by passing oxygen gas through the mixture for 25 hours at the rate of 0.4 liter per minute. Steam was then injected and the mixture was distilled until all the volatile by-products and unreacted cymene were removed.

A jacketed kettle fitted with an agitator and reflux condenser was charged with 30 liters of 60% sulfuric acid and the residue from the reaction flask was added. The mixture was heated to boiling and refluxed for 20 hours, after which it was cooled and filtered. The filter cake after drying weighed 134 grams, indicating a 28% yield of 1-(4-carboxyphenyl)-1,3,3-trimethyl-6-indanoic acid from the process.

This application is a continuation-in-part of our copending application, Serial No. 509,418, filed May 18, 1955, now abandoned.

We claim:

1. A method of producing a 1-(carboxyphenyl)-indanoic acid which comprises passing an oxygen containing gas at a temperature of about 40° C. to 180° C. through a mixture containing a polyvalent metal oxidation catalyst and a compound of the formula:

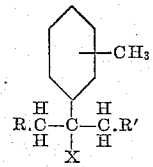

in which R and R' are members of the group consisting of hydrogen and alkyl radicals of 1 to 5 carbon atoms and R and R' together contain not more than 5 carbon atoms and X is a member of the group consisting of hydrogen and the hydroxyl radical until a substantial portion of said compound has been oxidized to a corresponding alpha-hydroxyalkyl benzoic acid, dissolving the latter benzoic acid in dilute aqueous mineral acid, and refluxing the resulting solution and recovering a 1-(carboxyphenyl)-indanoic acid so obtained.

2. A method of producing a 1-(carboxyphenyl)-indanoic acid according to the process of claim 1 wherein the compound initially oxidized is a cumene.

3. A method of producing 1-(4-carboxyphenyl)-1,3,3- trimethyl-6-indanoic acid which comprises passing oxygen through para-cymene containing a polyvalent metal oxidation catalyst at about 40° C.–180° C. until a substantial portion of said para-cymene has been oxidized to para-(alpha-hydroxyisopropyl)-benzoic acid, dissolving the resulting para-(alpha-hydroxyisopropyl)-benzoic acid in dilute aqueous mineral acid and refluxing the resulting solution and recovering the 1-(4-carboxyphenyl-1,3,-trimethyl-6-indanoic acid so obtained.

4. A method of producing alpha-hydroxyalkylbenzoic acids which comprises adding a polyvalent metal oxidation catalyst to a compound of the formula:

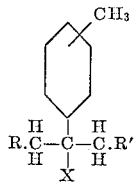

in which R and R' are members of the group consisting of hydrogen and alkyl radicals of 1 to 5 carbon atoms and R and R' together contain not more than 5 carbon atoms and X is a member of the group consisting of hydrogen and the hydroxyl radical, maintaining the mixture at about 40° C.–180° C. and passing an oxygen-containing gas therethrough until a substantial portion of said compound has been oxidized to the corresponding alpha-hydroxyalkylbenzoic acid.

5. A method of producing an alpha-hydroxyisopropylbenzoic acid which comprises adding a polyvalent metal oxidation catalyst to a cymene, maintaining the mixture at about 40° C.–180° C. and passing an oxygen-containing gas through the mixture until a substantial portion of said cymene has been oxidized to the corresponding alpha-hydroxyisopropylbenzoic acid.

6. A method of producing p-alpha-hydroxy-isopropylbenzoic acid which comprises passing an oxygen-containing gas through para-cymene containing about 1% of a hydrocarbon-soluble salt of cobalt and maintained at about 50° C.–90° C. and separating p-alpha-hydroxyisopropylbenzoic acid from the oxidation products obtained.

References Cited in the file of this patent

UNITED STATES PATENTS

| | | |
|---|---|---|
| 2,302,462 | Palmer et al. | Nov. 17, 1942 |
| 2,302,466 | Palmer et al. | Nov. 17, 1942 |
| 2,519,577 | Ipatieff et al. | Aug. 22, 1950 |
| 2,526,897 | Ipatieff et al. | Oct. 24, 1950 |
| 2,548,435 | Lorand et al. | Apr. 10, 1951 |
| 2,629,751 | Wiggins | Feb. 24, 1953 |
| 2,632,774 | Conner et al. | Mar. 24, 1953 |
| 2,636,899 | Burrows et al. | Apr. 28, 1953 |

OTHER REFERENCES

Cram: "J.A.C.S.," vol. 71, p. 3887 (1949).
Pines et al.: "J.A.C.S.," vol. 72, pp. 5521–3 (1950).
Hielbron Dictionary of Org. Compounds, vol. II, pp. 777–778 (1953).
"Acta. Chem. Scand.," vol. 3, pp. 279–296 (1949).
"Chem. Abstracts," vol. 49, p. 10233d (1955).
"Chem. Abstracts," vol. 50, p. 4872a (1956).